June 23, 1959 R. R. THALNER 2,892,019

COLOR TELEVISION SYSTEM

Filed July 2, 1954 2 Sheets-Sheet 1

INVENTOR.
Robert R. Thalner
BY Mason, Kolehmainen, Rathburn & Wyss
Att'ys

INVENTOR.
Robert R. Thalner
BY Mason, Kolehmainen, Rathburn & Wyss
Att'ys

United States Patent Office 2,892,019
Patented June 23, 1959

2,892,019

COLOR TELEVISION SYSTEM

Robert R. Thalner, Buffalo, N.Y., assignor to Sylvania Electric Products Inc., a corporation of Delaware Application July 2, 1954, Serial No. 440,900

14 Claims. (Cl. 178—5.4)

Figure 1:
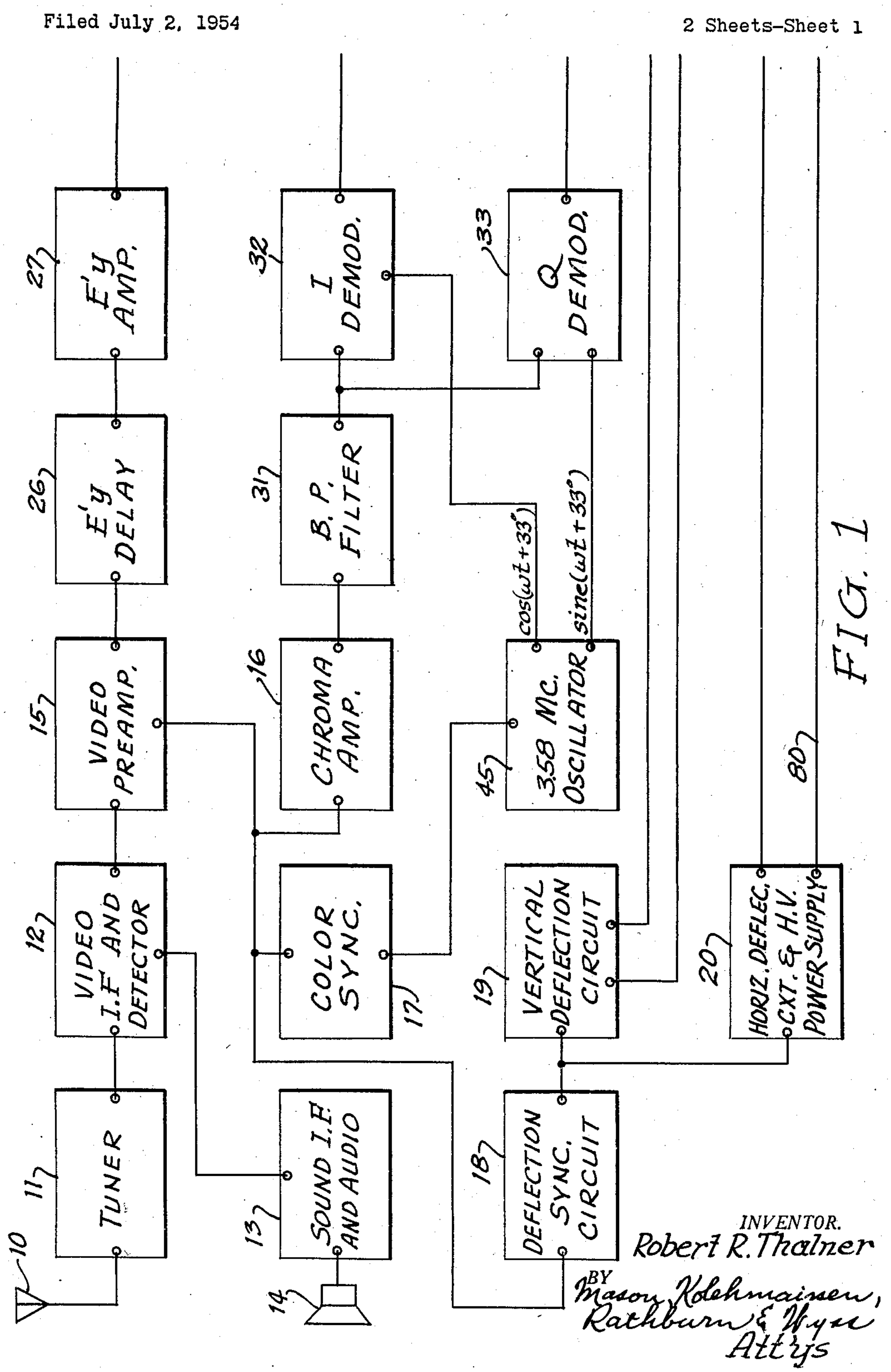

The present invention relates to cathode ray tube reproducing apparatus, more particularly to cathode ray tube apparatus of the type suitable for reproducing a transmitted television image in color, and the invention has for an object the provision of a new and improved cathode ray tube arrangement for reducing the high voltage power required to produce a satisfactory color picture so that a high voltage power supply of substantially less cost and current capacity may be utilized.

In present day color television receivers it is customary to employ a cathode ray tube for reproduction of the color picture which is provided with three electron guns for the three primary colors, the electron beams generated by these guns being directed so as to pass through apertures in a so-called shadow mask and fall upon clusters of phosphor dots, one for each primary color as the beams are deflected in accordance with a received television signal. In these color television receivers a high anode voltage on the order of fifteen to thirty thousand volts is required for the cathode ray tube and the high voltage producing components of the receiver constitute a relatively large percentage of the total cost of the receiver. It is, therefore, another object of the present invention to provide a new and improved cathode ray tube arrangement which requires a high voltage power supply of minimum current capacity commensurate with the production of an acceptable picture on the face of the cathode ray tube.

It is a further object of the present invention to provide a new and improved color television receiver arrangement wherein the average current drain of the cathode ray tube reproducing device is substantially reduced so that a relatively inexpensive high voltage power supply may be employed in the receiver.

A still further object of the present invention resides in the provision of a new and improved cathode ray tube arrangement for color television receivers wherein the strength of the cathode ray tube electron beams is reduced during periods when the beams are not used to reproduce the color picture so that the average beam current required for the cathode ray tube is substantially reduced.

Briefly, in accordance with one phase of the invention, a beam current reducing signal is derived from the shadow mask of the tricolor picture tube, this signal having a first value during periods when the electron beams pass through an aperture in the mask and a second value during periods when the electron beams strike the mask as the beams are deflected in accordance with the received television signal. The beam current reducing signal is impressed upon a control electrode of each of the electron beam producing guns in the tricolor picture tube so as to reduce the strength of the electron beams during periods when the beams strike the shadow mask and are not employed in actual reproduction of the color picture. As a result, the average beam current required by the tricolor picture tube is substantially reduced and a high voltage power supply of relatively small current capacity, which is less expensive than conventional high voltage power supplies, may be employed. In a preferred form of the invention, a vertical retrace blanking signal may be combined in the beam current reducing circuit so as to provide normal retrace blanking in conjunction with the above described beam current reducing action for all three electron guns of the tricolor picture tube.

Figures 2, 3:
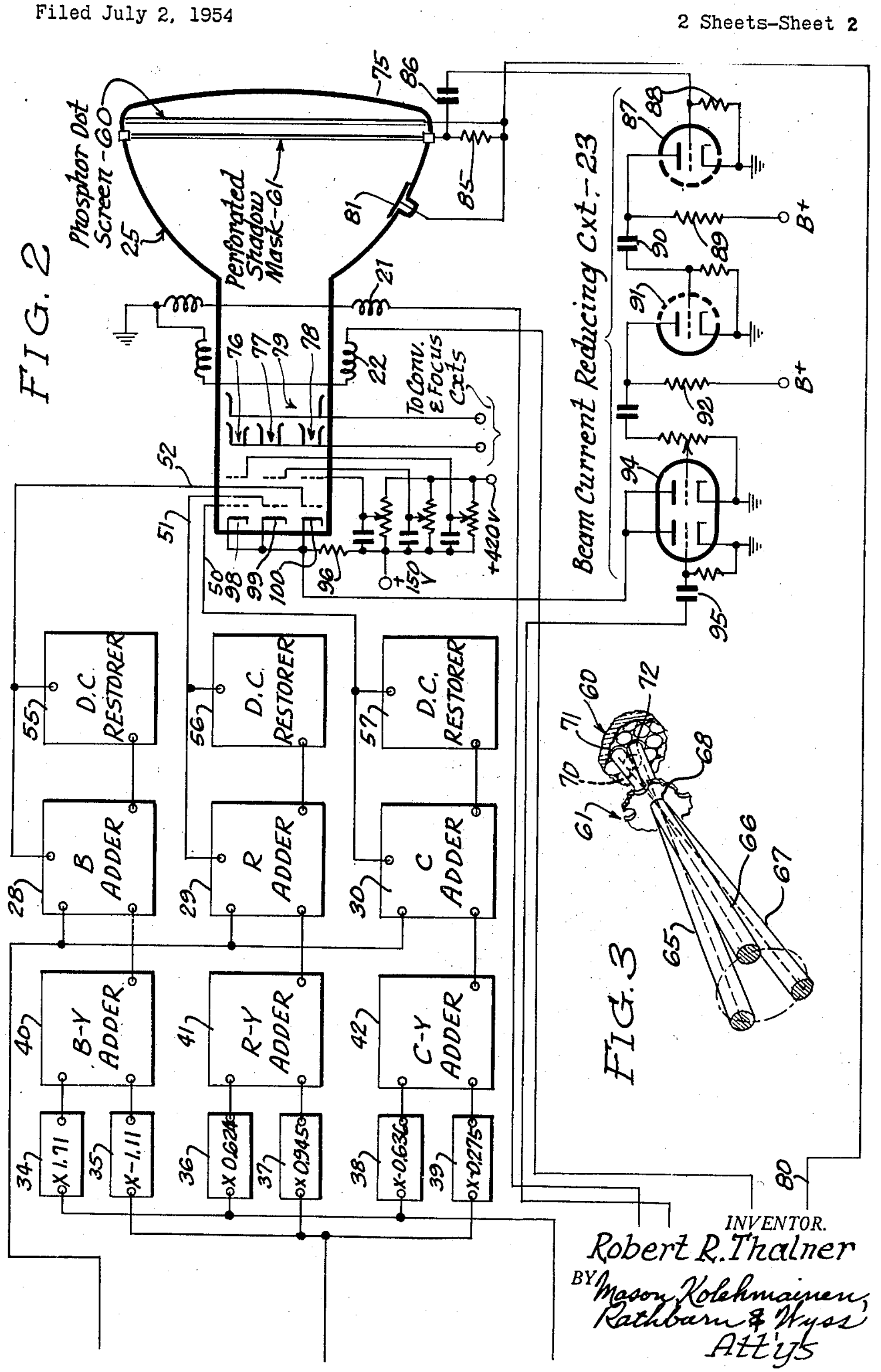

The invention, both as to its organization and method of operation, together with further objects and advantages thereof, will best be understood by reference to the following specification taken in connection with the accompanying drawings, in which:

Figs. 1 and 2, when laid side by side, disclose a color television receiver, partly in block diagram form embodying the principles of the present invention; and Fig. 3 is a perspective view in diagrammatic form of a portion of the cathode ray tube employed in the receiver of Figs. 1 and 2.

Referring now to the drawings, the cathode ray tube reproducing apparatus of the present invention is shown in conjunction with a complete tricolor television receiver which includes an antenna system 10 connected to a tuner unit 11 which is adapted to select any desired color television station and convert the received color television signal into a suitable intermediate frequency signal which is amplified and detected in the video IF amplifier and detector 12 so as to reproduce the composite color video signal in the output of the unit 12. An intercarrier sound signal is derived from the last video IF amplifier tube in the unit 12 and is supplied to the sound IF amplifier and audio channel 13 so as to reproduce the sound signal accompanying the color television picture signal in the loud speaker 14.

The video signal developed in the output of the second detector in the unit 12 is amplified in the video preamplifier 15 and is supplied to a chroma amplifier 16, a color synchronization circuit 17 and a synchronizing signal separator circuit 18. In the circuit 18 the horizontal and vertical synchronizing signals are separated and are supplied to the vertical deflection circuit 19 and the horizontal deflection and high voltage power supply 20, the circuits 19 and 20 providing suitable scanning currents in the vertical deflection coils 21 and horizontal deflection coils 22, respectively, which surround the neck of the tricolor cathode ray tube indicated generally at 25. A beam current reducing circuit 23 is provided in accordance with the present invention to reduce the beam current which the cathode ray tube 25 draws from the high voltage power supply 20, as will be described in more detail hereinafter.

The monochrome channel of the color television signal includes the video preamplifier 15, an $E'_Y$ delay circuit 26 and $E'_Y$ amplifier 27, the output of the amplifier 27 being impressed upon a blue adder circuit 28, a red adder circuit 29 and a green adder circuit 30 in parallel. The chrominance channel of the receiver includes the chroma amplifier 16, a band pass filter 31, and I color demodulator 32 and a Q color demodulator 33, which are controlled by a 3.58 mc. crystal oscillator 45 which is synchronized from the color synchronization circuit 17, the color difference signal matrices 34 to 39, inclusive, and the color difference signal adder circuits 40, 41 and 42. The color signals produced in the outputs of the adder circuits 28, 29 and 30 are coupled to the control grids of the three electron beam producing guns in the tricolor cathode ray tube 25. Thus, the output of the blue adder circuit 28 is coupled to the control grid 50 of the blue gun, the output of the red adder circuit 29 is connected to the control grid 51 of the red gun and the output of the green adder circuit 30 is connected to the control grid 52 of the green gun, suitable D.C. restorer circuits 55, 56 and 57 being provided in the outputs of the adder circuits 28, 29 and 30 to maintain a fixed reference level which is independent of variations in the video signal.

All of the component units described thus far may be of conventional well known construction so that a detailed description thereof is considered unnecessary herein. Referring briefly, however, to the operation of the above described system as a whole, one of the modulated carrier wave color television signals intercepted by the antenna system 10 is selected in the tuner 11 and converted to a suitable intermediate frequency signal which is amplified and detected in the unit 12 so as to reproduce the composite video signal. In order to decode the color signal correctly, the 3.58 mc. color burst signal of the composite wave is derived from the output of the video preamplifier 15 by means of the color synchronization circuit 17 and a control signal is supplied to the 3.58 mc. crystal oscillator 45 so as to maintain this oscillator in correct phase relationship with respect to the received television signal. In the monochrome channel the delay circuit 16 is provided so that the monochrome and chrominance components are impressed upon the adder circuits 28, 29 and 30 in time coincidence so as to permit reproduction of the desired color signals. The video signal from the amplifier 15 is further amplified in the chroma amplifier 16 and the band width of the output signal thereof is restricted in the band pass filter 31 to a frequency range of from 2 mc. to 4 mc., the output of the filter 31 being supplied to the I modulator 32 and the Q modulator 33. The $E'_I$ and $E'_Q$ components are obtained by product demodulation in the demodulators 32 and 33, it being understood that the I demodulator output circuit has a pass band of approximately 1.5 mc. whereas the Q demodulator output circuit has a pass band of .5 mc. The $E'_I$ and $E'_Q$ color components are then combined in the proper proportions to form the three primary color-difference signals in the matrices 34 to 39, inclusive, each of the matrices 34 to 39, inclusive, having the indicated coefficients so as to produce the desired color-difference signals in the output circuits of the adders 40, 41 and 42. The color-difference signals developed in the output circuits of the adders 40, 41 and 42 are then added to the monochrome signal component developed by the amplifier 27 so as to produce the desired color signals which are employed to modulate the electron beams produced by the respective color guns of the cathode ray tube 25.

In the cathode ray tube 25, a phosphor dot screen 60 is provided and an apertured plate, or so-called shadow mask 61 is interposed between the screen 60 and the three electron beam producing guns positioned within the neck of the cathode ray tube 25. As shown in more detail in Fig. 3, the three electron beams 65, 66 and 67 which are developed by the three color guns, are focused and directed so as to converge at a common point in the plane of the apertured plate 61 so that all three beams may pass through a single aperture 68 in the plate 61. After the beams pass through the aperture 68 they diverge by sufficient amounts that the beams strike different colored dots 70, 71 and 72 which are arranged in a cluster on the phosphor dot screen 60. As the beams 65, 66 and 67 are deflected under the control of the deflection circuits 19 and 20 they are deflected in unison across the apertured plate 61 so that they pass through successive apertures in the plate 61. The plate 61 blocks or masks off the beams 65, 66 and 67 between apertures so that color selection is provided and the color signals simultaneously supplied to the three guns of the cathode ray tube 25 modulate the respective electron beams in accordance therewith so as to produce a tricolor picture on the screen 60. In this connection, it will be understood that the screen 60 may be positioned inside of a clear face plate 75 or, in the alternative, the screen 60 may be curved so as to form the face plate of the cathode ray tube itself, as will be readily understood by those skilled in the art. In either case, suitable focus and convergence signals are applied to the individual focus electrodes 76, 77 and 78 of the guns and to the common convergence electrode 79 so as to compensate for the different lengths of the beams as the raster is scanned, these variable focus and convergence signals being derived from the vertical and horizontal deflection circuits 19 and 20 in a conventional manner.

Referring now more particularly to the beam current reducing circuit 23 in relation to the other portions of the receiver, the high voltage for the cathode ray tube 25, which is developed in the circuit 20, is supplied over the conductor 80 to the high voltage or accelerating anode 81 and the apertured plate or shadow mask 61 is also connected to the high voltage supply. However, in accordance with the present invention a resistor 85 is connected between the plate 61 and the high voltage conductor 80 so that a beam current reducing signal is developed across the resistor 85 which is proportional to the flow of beam current in the plate 61. More particularly, during periods when the electron beams pass through one of the apertures in the plate 61 a relatively small amount of current flows in the aperture plate circuit so that a relatively small voltage is produced across the resistor 85. On the other hand, during the periods when the beams strike the plate 61 and are prevented from reaching the screen 60, a relatively large current flows in the resistor 85 so that a relatively large voltage is produced across this resistor. A negative going pulse type signal is thus produced across the resistor 85 which is coupled through the condenser 86 to the control grid of the triode amplifier tube 87, a grid leak resistor 88 being connected between the control grid of this tube and ground. In this connection it will be understood that if the phosphor dot screen is connected to the high voltage conductor 80, as for example, when an aluminized screen is employed, the screen 60 is preferably connected outside the resistor 85 so that beam current flowing in the screen circuit does not flow through the resistor 85 and hence does not offset the beam current reducing signal produced across this resistor.

The negative pulse output signal impressed upon the control grid of the tube 87 is amplified in this tube and appears as a positive going signal across the anode resistor 89 thereof. The signal produced across the resistor 89 is coupled through the condenser 90 to the control grid of a second amplifier tube 91 wherein it is further amplified and inverted in phase so as to appear as a negative going signal across the anode resistor 92 of the tube 91. The signal developed across the resistor 92 is coupled through the condenser 93 to the control grid of the right hand triode section of the double triode mixer tube 94.

In order to apply a vertical retrace blanking signal to the cathode of each gun while, at the same time, permitting the relatively high frequency beam current reducing signal to be applied to these cathodes, a vertical retrace blanking signal in the form of a negative going pulse which occurs during the vertical retrace intervals is derived from the vertical deflection circuit 19 by suitable means well known to the art and is coupled through the condenser 95 to the control grid of the left hand triode section of the mixer tube 94. Both of the triode sections of the tube 94 are operated at zero bias so as to provide a clipping action for the negative signals impressed upon the control grids thereof. The anodes of the two triode sections of the tube 94 are connected together and through the common anode resistor 96 to the positive anode potential supply, the cathodes 98, 99 and 100 of the three color guns being connected together and to the plates of the mixer tube 94 so as to provide direct coupling between the anode circuit of the mixer and the cathodes of the electron guns in the cathode ray tube 25.

Considering now the operation of the above described beam current reducing circuit 23 of the present invention, when the electron beams 65, 66 and 67 strike the apertured plate 61 the negative going pulse produced across the resistor 85 is amplified and shaped in the amplifier tubes 87 and 91 and impressed upon the control grid of the right hand section of the mixer tube 94. Accordingly, a positive going pulse is produced across the resistor 96 during periods when the electron beams 65, 66 and 67 strike the plate 61 so that the potential of the cathodes 98, 99 and 100 is increased relative to the control grid potentials of the respective electron guns with the result that the strength of the electron beams 65, 66 and 67 is substantially reduced during periods when the beams strike the plate 61.

During vertical retrace intervals the negative vertical retrace pulses impressed upon the control grid of the left hand section of the tube 94 function in a similar manner to raise the potential of the cathodes 98, 99 and 100 by an amount sufficient completely to cut off the electron beams 65, 66 and 67 during vertical retrace intervals. Since the electron beams are completely cut off during vertical retrace intervals, no voltage is produced across the resistor 85 in series with the apertured plate 61.

However, during the horizontal trace intervals the strength of the electron beams 65, 66 and 67 is reduced during periods when the beams strike the plate 61 so that a substantially less average current is drawn from the high voltage power supply in the circuit 20 with the result that a relatively inexpensive high voltage power supply may be utilized. In this connection it will be understood that the beams 65, 66 and 67 are not completely cut off by the beam current reducing circuit 23 since some current must flow through the resistor 85 in order to produce a beam current reducing signal. However, the amplification in the tubes 87 and 91 is preferably sufficiently large that when a relatively small beam current reducing signal is produced across the resistor 85, a sufficiently large voltage pulse is produced across the resistor 96 to reduce the beam current by the desired amount. It will also be understood that the beam current reducing signal derived from the resistor 85 should not modulate the electron beams during periods when these beams are used to reproduce the color television signal, i.e., during periods when the beams pass through an aperture in the plate 61. Thus, if the clipping and limiting action in the tubes 87, 91 and 94 does not produce sufficient wave shaping action, the negative pulses developed across the resistor 85 may be shaped by any suitable wave shaping network, or delayed by a suitable pulse delay circuit so that the electron beams 65, 66 and 67 are not modulated in any way by the beam current reducing signal during periods when the beams pass through an aperture in the plate 61, as will be readily understood by those skilled in the art.

While there has been described what is at present considered to be the preferred embodiment of the invention, it will be understood that various modifications may be made therein which are within the true spirit and scope of the invention as defined in the appended claims.

What is claimed as new and desired to be secured by Letters Patent of the United States is:

1. In cathode ray tube apparatus, a cathode ray tube having at least one electron beam producing electron gun, a fluorescent screen and an apertured plate interposed between said gun and said screen, means for impressing on said apertured plate a relatively high voltage positive with respect to said gun, means for deflecting said beam, means in circuit with said high voltage supply and said apertured plate for deriving a signal having one value during periods when said beam strikes said apertured plate and a different value during periods when said beam passes through an aperture in said plate, and means for impressing said signal on a control electrode of said gun in the proper polarity to reduce the strength of said beam during periods when said beam strikes said plate.

2. In cathode ray tube reproducing apparatus, a cathode ray tube having at least one electron beam producing gun, a fluorescent screen and an apertured plate interposed between said gun and said screen, means for deflecting said beam to traverse the apertures in said plate, means for deriving a signal from said apertured plate indicative of the traversal of the apertures in said plate by said beam, and means for impressing said signal on a control electrode of said gun in the correct phase to reduce the strength of said beam during periods when said beam strikes said apertured plate.

3. In color television reproducing apparatus, a cathode ray tube having a plurality of electron beam producing guns, a fluorescent screen and an apertured plate interposed between said guns and said screen, means for deflecting said beams in accordance with a received color television signal so that said beams traverse the apertures in said plate in predetermined sequence, means for deriving a signal from said apertured plate having a first value during periods when said beams strike said plate and a different value when said beams pass through an aperture in said plate, and means for impressing said signal on a control element of each of said guns in the correct polarity to reduce the strength of said beams during periods when said beams strike said apertured plate.

4. In color television reproducing apparatus, a cathode ray tube having a plurality of electron beam producing guns, a fluorescent screen and an apertured plate interposed between said guns and said screen, means for deflecting said beams in unison in accordance with a received color television signal so that said beams traverse the apertures in said plate, an energizing circuit for supplying operating potential to said apertured plate, the current flow in said energizing circuit being greater during periods when said beams strike said plate than during periods when said beams pass through one of the apertures of said plate, and means responsive to current flow in said energizing circuit for reducing the strength of said beams during periods when said current flow is of said greater value.

5. In color television reproducing apparatus, a cathode ray tube having a plurality of electron beam producing guns, a fluorescent screen and an apertured plate interposed between said guns and said screen, means for deflecting said beams in unison in accordance with a received color television signal so that said beams traverse the apertures in said plate, and a beam current reducing circuit for reducing the strength of said beams during periods when said beams strike said plate.

6. In color television reproducing apparatus of the type provided with a cathode ray tube having a plurality of electron beam producing guns, a fluorescent screen and an apertured plate interposed between said screen and said guns and having means for deflecting said beams in accordance with a received color television signal so that said beams traverse the apertures in said plate, a beam current reducing circuit responsive to current flow in said apertured plate for reducing the strength of said beams during periods when said beams strike said plate.

7. Cathode ray tube apparatus comprising a fluorescent screen, means for producing an electron beam, means for directing said beam toward said screen, apertured means disposed between said first named means and said screen for selectively intercepting the electrons of said beam, and control means responsive to the number of electrons striking said apertured means for reducing the strength of said beam during periods when said beam is intercepted by said apertured means.

8. In color television reproducing apparatus, a cathode ray tube having a plurality of electron beam producing guns, a fluorescent screen and an apertured plate interposed between said guns and said screen, means for deflecting said beams in unison in accordance with a received color television signal so that said beams traverse the apertures in said plate, a high voltage power supply, means for connecting said power supply to said apertured plate, and means for reducing the average current drawn from said power supply, said last-named means including means for reducing the strength of said electron beams during periods when said beams strike said apertured plate.

9. In color television reproducing apparatus, a cathode ray tube having a plurality of electron beam producing guns, a fluorescent screen and an apertured plate interposed between said guns and said screen, means for deflecting said beams in unison in accordance with a received color television signal so that said beams traverse the apertures in said plate, a high voltage power supply, a resistor connected between said power supply and said apertured plate so that current flowing in said plate produces a voltage across said resistor, means for amplifying the voltage developed across said resistor and means for impressing said amplified voltage on a control electrode of each of said guns in the correct polarity to reduce the strength of said beams during periods when said beams strike said plate.

10. In color television reproducing apparatus, a cathode ray tube having a plurality of electron beam producing guns, a fluorescent screen and an apertured plate interposed bewteen said guns and said screen, means for deflecting said beams in unison in accordance with a received color television signal so that said beams traverse the apertures in said plate, a high voltage power supply, a resistor connected in circuit with said power supply to said apertured plate, whereby a pulse type signal is developed across said resistor the on-pulse intervals of which represent periods when said beams strike said plate and the off-pulse intervals of which represent periods when said beams pass through one of the apertures in said plate, means for amplifying and shaping said pulses so that they occur within said first-named periods, and means for impressing said amplified and shaped pulses to the cathode of each of said guns in the correct polarity to reduce the strength of said beams.

11. In color television reproducing apparatus, a cathode ray tube having a plurality of electron beam producing guns, a fluorescent screen and an apertured plate interposed between said guns and said screen, means including vertical deflection means for deflecting said beams in accordance with a received color television signal so that said beams traverse the apertures in said plate, a high voltage power supply, an impedance connected in circuit with said power supply to said apertured plate so that current flowing in said plate produces a voltage across said impedance, means for deriving vertical retrace pulses from said vertical deflection means, means for combining said vertical retrace pulses and the voltage developed across said impedance to form a composite blanking signal, and means for impressing said composite blanking signal on a control electrode of each of said electron beam producing guns.

12. In color television reproducing apparatus, a cathode ray tube having a plurality of electron beam producing guns, a fluorescent screen and an apertured plate interposed between said guns and said screen, means including vertical deflection means for deflecting said beams in accordance with a received color television signal so that said beams traverse the apertures in said plate, a high voltage power supply, an impedance connected in circuit with said power supply to said apertured plate so that current flowing in said plate produces a voltage across said impedance, means for deriving vertical retrace pulses from said vertical deflection means, means for developing pulses from the voltage produced across said impedance which occur during periods when said beams strike said plate, an impedance common to the cathode circuit of each of said guns, and means for impressing said retrace pulses and said developed pulses on said common cathode impedance.

13. In combination, a cathode ray tube having an electron emitting cathode, a control grid, an apertured shadow mask and a phosphor screen in the order named; a source of positive potential; a resistor connecting said source to said shadow mask; and, a circuit for subjecting said control grid and cathode to a voltage related to the current flow through said resistor whereby the strength of the electron stream of said cathode ray tube is reduced when it impinges upon said shadow mask and increases when said stream passes through apertures in said mask, the over-all effect being to reduce the high voltage power used by said cathode ray tube.

14. In combination, a cathode ray tube having an electron emitting cathode, a control grid, an apertured mask and a phosphor screen, in the order named; a source of positive potential; a resistor connecting said source to said mask; a control tube having an anode, a cathode and a grid, the anode of the control tube being connected to the cathode of said cathode ray tube; a source of anode potential connected to said anode; and, a circuit for applying a voltage, responsive to the current flowing through the resistor connected to said mask, to the grid and cathode of said control tube, the arrangement being such that the electron stream of said cathode ray tube is reduced in value as it impinges on the mask.

References Cited in the file of this patent

UNITED STATES PATENTS

| | | |
|---|---|---|
| Re. 23,964 | Jenny | Mar. 22, 1955 |
| 2,576,093 | Arditi | Nov. 27, 1951 |
| 2,663,821 | Law | Dec. 22, 1953 |
| 2,681,381 | Creamer | June 15, 1954 |
| 2,689,269 | Bradley | Sept. 14, 1954 |
| 2,792,522 | Welch | May 14, 1957 |